United States Patent [19]

Halpaap et al.

[11] Patent Number: 5,852,101
[45] Date of Patent: Dec. 22, 1998

[54] POWDER COATING COMPOSITIONS AND THEIR USE FOR COATING HEAT-RESISTANT SUBSTRATES

[75] Inventors: Reinhard Halpaap, Odenthal; Christian Wamprecht, Neuss; Hans-Joachim Kreuder, Toenisvorst; Wolfgang Schultz, Krefeld; Manfred Bock, Leverkusen, all of Germany; Rainer Rettig, Amagasaki, Japan

[73] Assignee: Bayer Aktiengesellschaft, Leverkusen, Germany

[21] Appl. No.: 958,227

[22] Filed: Oct. 27, 1997

Related U.S. Application Data

[63] Continuation of Ser. No. 890,979, May 29, 1992, abandoned.

[30] Foreign Application Priority Data

Jun. 1, 1991 [DE] Germany ............... 4 1 18 052.6

[51] Int. Cl.$^6$ ............... C08J 3/00; C08K 3/00; C08L 75/00; C08F 8/30
[52] U.S. Cl. ............. 524/507; 428/423.1; 525/123; 525/453; 525/455; 528/44
[58] Field of Search ............... 528/44; 525/453, 525/455, 123; 428/423.1; 524/507

[56] References Cited

U.S. PATENT DOCUMENTS

| | | | |
|---|---|---|---|
| 3,660,355 | 5/1972 | Johnson et al. | 260/77.5 CR |
| 3,931,117 | 1/1976 | Leonard | 260/77.5 TB |
| 3,933,759 | 1/1976 | Hoeschele | 260/77.5 TB |
| 3,993,849 | 11/1976 | Victorius | 428/463 |
| 4,824,909 | 4/1989 | Togo et al. | 525/124 |
| 4,975,513 | 12/1990 | Kim et al. | 528/45 |

FOREIGN PATENT DOCUMENTS

| | | |
|---|---|---|
| 272346 | 6/1988 | European Pat. Off. . |
| 408997 | 1/1991 | European Pat. Off. . |
| 3525110 | 1/1987 | Germany . |

*Primary Examiner*—Patrick D. Niland
*Attorney, Agent, or Firm*—Joseph C. Gil; Thomas W. Roy; Diderico van Eyl

[57] ABSTRACT

The present invention relates to a powder coating composition for the production of non-yellowing flexible coatings which is solid below 30° C. and liquid above 120° C. and contains a mixture of A) a polyisocyanate component which
  i) has a content of blocked isocyanate groups (expressed as NCO, molecular weight=42) of 3.0 to 14.0% by weight,
  ii) has a functionality, based on the blocked isocyanate groups, of 1.9 to 2.3 and
  iii) and contains at least one ε-caprolactam-blocked polyisocyanate based on the reaction product of 4,4'-diisocyanatodicyclohexyl methane with a polyol component having an average molecular weight of 90 to 400 and containing at least 50% by weight, based on the weight of the polyol component, of one or more (cyclo)aliphatic diols containing 4 to 12 carbon atoms, B) a polyol component containing at least one polyhydroxy polyacrylate having an OH number of 40 to 120 and C) an organotin catalyst for the reaction between hydroxyl groups and blocked isocyanate groups, wherein components A) and B) are present in quantities which correspond to an equivalent ratio of blocked polyisocyanate groups to hydroxyl groups of 0.5:1 to 1.2:1. The present invention also relates to the a heat-resistant substrate which is coated with this powder coating composition.

17 Claims, No Drawings

POWDER COATING COMPOSITIONS AND THEIR USE FOR COATING HEAT-RESISTANT SUBSTRATES

This application is a continuation of application Ser. No. 07/890,979 filed May 29, 1992, now abandoned.

BACKGROUND OF THE INVENTION

1. Field of the Invention

This invention relates to a new powder coating composition based on $\epsilon$-caprolactam-blocked polyisocyanates and hydroxy-functional polyacrylates and to the use of this powder coating composition in the production of coatings on heat-resistant substrates, particularly for clear automobile coatings.

2. Description of the Prior Art

Polyurethane-based powder lacquers are known (cf. for example DE-AS 1,957,483, DE-OS 2,047,718, DE-OS 2,064,098, DE-PS 2,127,839, DE-OS 2,246,620, DE-AS 2,351,477, DE-OS 2,429,517).

They generally consist of a combination of solid polyhydroxyl compounds and solid, generally blocked polyisocyanates.

In practice, the predominant polyhydroxyl compounds are polyesters, although polyacrylate-based PUR powder coatings have also been known for some time. Thus, DE-OS 1,771,374 describes PUR powder coatings containing of OH-functional polyacrylates produced in bulk with vapor cooling and phenol-blocked polyisocyanates based on tolylene diisocyanate. Combinations of polyacrylates with aromatic polyisocyanate crosslinkers which are suitable as powder coatings are also described, for example, in DE-OS 2,127,839 and DE-OS 2,127,922. However, powder coatings such as these are unsuitable for external applications because of the tendency of aromatic polyisocyanates to yellow.

Accordingly, blocked polyisocyanates based on aliphatic diisocyanates are used as curing components for light-stable coating systems. These blocked polyisocyanates are primarily derivatives, for example urethanes or isocyanurates, based on 35376TWR2692 isophorone diisocyanate (IPDI) which are blocked with $\epsilon$-caprolactam (cf. for example DE-OS or -PS 2,105,777, 2,542,191, 2,712,931, 2,735,497, 2,842,641, 2,929,224, 3,004,876, 3,039,824, 3,143,060 and 3,328,131).

Coatings distinguished by good levelling, high hardness and elasticity and good resistance to chemicals are obtained from these $\epsilon$-caprolactam-blocked IPDl derivatives during stoving with suitable polyhydroxyl compounds, such as polyesters, and combine ease of handling with high stability in storage. However, a major disadvantage of these polyurethane powder coatings is the high stoving temperature of around 200° C.

Accordingly, there has been no shortage of attempts to lower the high stoving temperatures by using other blocking agents. Blocking agents with low unblocking temperatures which have been proposed for curing polyurethane powder lacquers include triazoles (DE-OS 2,812,252), cyclic amidines (DE-OS 2,946,085), secondary amines (DE-OS 3,434,881) and ketoximes (US 3,857,818, EP 401,343 and EP 409,745).

Besides IPDl-based curing agents for powder coatings, the suitability of other aliphatic diisocyanates for curing powder coatings is also mentioned in the numerous prior publications cited by way of example in the foregoing. Blocked polyisocyanates of di- or triisocyanates are described, for example, in DE-OS 3,128,743, EP 132,515, EP 132,518, EP 218,040, DE-PS 2,801,126.

None of these publications contains any suggestion that $\epsilon$-caprolactam blocked curing agents based on aliphatic diisocyanates in combination with solid polyhydroxyl compounds cure at particularly low temperatures, i.e., $\leq 160°$ C., depending upon the aliphatic diisocyanates used. Only in EP-A-0,403,779 (which discloses m-tetramethyl xylene diisocyanate blocked with $\epsilon$-caprolactam) is there a reference to a curing agent which, by virtue of its special structure with only tert.-bound isocyanate groups, is suitable as a curing agent for powder coatings at low stowing temperatures (approx. 140° C. and higher).

The use of catalysts for the reaction of solid blocked polyisocyanates with solid polyhydroxyl compounds is known and there have been many attempts to lower the required stoving temperatures by a suitable choice of catalyst. For example, DE-OS 3,525,110 describes a very special catalyst, i.e., dioctyl tin oxide and/or sulfide, which may be used to reduce the stoving temperatures for $\epsilon$-caprolactam-blocked polyisocyanates to 170° C.

An object of the present invention is to provide a new powder coating composition which combines the advantages of known powder coatings and which, in addition, would be curable at temperatures well below 170° C.

This object may be achieved with the powder coating composition of the present invention, which is described in detail hereinafter. The principal binder component of this powder coating composition contains hydroxy-functional polyacrylates and, as the curing agent, $\epsilon$-caprolactam-blocked, urethane-modified (preferably with diols) 4,4'-diisocyanatodicyclohexyl methane.

The discovery that it is possible with this binder composition to produce coatings combining high solvent resistance and elasticity with low stoving temperatures must be regarded as surprising. Powder coating compositions based on polyhydroxypolyacrylates, in contrast to those based on polyester polyols, were known to result in brittle coatings. In addition, there is no reference in the relevant prior publications, which mention 4,4'-diisocyanatodicyclohexyl methane or derivatives thereof in $\epsilon$-caprolactam-blocked form as curing agents, to the lower stoving temperature of the composition and increased elasticity of the resulting coating when this diisocyanate is used in combination with polyacrylates (cf. for example U.S. Pat. No. 3,931,117, U.S. Pat. No. 3,933,759 or DE-OS 3,525,110).

U.S. Pat. No. 3,931,117 mentions inter alia that $\epsilon$-caprolactam-blocked, urethane-modified derivatives of 4,4'-diisocyanatodicyclohexyl methane are equivalent to corresponding derivatives of IPDI; however, trihydric alcohols, such as trimethylol propane, are used in all of the examples wherein the starting diisocyanate is modified to contain urethane groups. The powder coating compositions specifically described are in no way suitable for achieving the previously described objects of the present invention.

SUMMARY OF THE INVENTION

The present invention relates to a powder coating composition for the production of non-yellowing flexible coatings which is solid below 30° C. and liquid above 120° C. and contains a mixture of A) a polyisocyanate component which
  i) has a content of blocked isocyanate groups (expressed as NCO, molecular weight=42) of 3.0 to 14.0% by weight, ii) has a functionality, based on the blocked isocyanate groups, of 1.9 to 2.3 and iii) contains at least one ε-caprolactam-blocked polyisocyanate based on the reaction product of 4,4'-diisocyanatodicyclohexyl methane with a polyol component having an average molecular weight of 90 to 400 and containing at least 50% by weight, based on the weight of the polyol component, of one or more (cyclo)aliphatic diols containing 4 to 12 carbon atoms, B) a polyol component containing at least one polyhydroxy polyacrylate having an OH number of 40 to 120 and C) an organotin catalyst for the reaction between hydroxyl groups and blocked isocyanate groups, wherein components A) and B) are present in quantities which correspond to an equivalent ratio of blocked isocyanate groups to hydroxyl groups of 0.5:1 to 1.2:1.

The present invention also relates to the a heat-resistant substrate which is coated with this powder coating composition.

DETAILED DESCRIPTION OF THE INVENTION

Component A) of the powder coating composition according to the invention contains at least one ε-caprolactam-blocked, urethane-modified 4,4'-diisocyanatodicyclohexyl methane. Starting materials for the production of component A) are 4,4'-diisocyanatodicyclohexyl methane, organic polyhydric alcohols and ε-caprolactam.

Any commercially available forms of 4,4'-diisocyanatodicyclohexyl methane may be used in accordance with the invention; the cis/trans isomerism is not critical.

At least 50% by weight, preferably at least 80% by weight and more preferably 100% by weight of the polyol component for the urethane modification of the starting diisocyanate are aliphatic or cycloaliphatic diols containing 4 to 12, preferably 6 to 12 carbon atoms. The polyol component has an average molecular weight of 90 to 400, preferably 90 to 250.

The principal constituent of the polyol component for the modification of the starting diisocyanates are the diols mentioned hereinafter, although monohydric alcohols having a molecular weight of 32 to 130 (such as methanol, ethanol, isopropanol, n-hexanol), or higher functional alcohols may also be used in addition to the required diols. The average hydroxyl functionality of the polyol component used for the modification of the starting diisocyanates must be selected so that the ε-caprolactam-blocked, urethane-modified polyisocyanates A) have a functionality, based on the blocked NCO groups, of 1.9 to 2.3, preferably 2.0 to 2.2.

Examples of dihydric and higher alcohols which may be used for the modification of the starting diisocyanates include the isomeric butanediols, hexanediols, octanediols as well as diethylene glycol, triethylene glycol, dipropylene glycol, tripropylene glycol, 4,4'-dihydroxydicyclohexyl methane, 2,2-bis-(4-hydroxycyclohexyl)-propane, 1,4-bis-(2-hydroxy-ethoxy)-benzene, 1,4-bis-hydroxymethyl cyclohexane, 2,2-dimethylpropane-1,3-diol, trimethylol propane, N,N',N"-tris-hydroxyethyl isocyanurate, pentaerythritol and mixtures of these polyhydroxy compounds. The trifunctional and/or tetrafunctional hydroxyl compounds are used in only small quantities, if at all. Among the diols, the linear aliphatic compounds, such as butane-1,4-diol, hexane-1,6-diol and diethylene glycol, are preferred.

ε-Caprolactam is used as the blocking agent. To produce the blocked polyisocyanates A), either 4,4'-diisocyanatodicyclohexyl methane may first be reacted with the selected quantity of blocking agent (ε-caprolactam) until the NCO content has reached or is slightly below the theoretical NCO content, after which the remaining free NCO groups are reacted with the hydroxyl groups of the polyols. This procedure is preferred. Alternatively, however, the diisocyanate may be initially reacted with the selected polyols until the NCO content has reached or is slightly below the theoretical value, after which the remaining free NCO groups are reacted with the blocking agent, ε-caprolactam, until component A) is substantially free from, i.e., contains less than 0.5% by weight, free isocyanate groups. When the polyisocyanates A) are produced in this manner, the starting diisocyanate is reacted with the polyols at an NCO:OH equivalent ratio of 1.2:1 to 5:1, preferably 1.4:1 to 3:1, after which the excess unreacted isocyanate groups are blocked with ε-caprolactam. In this blocking reaction, the quantity of blocking agent has to be gauged in such a way that at least 80%, preferably 100%, of the NCO groups still present after the urethanization reaction are blocked. An excess of up to 10% by weight ε-caprolactam, based on the free isocyanate groups present after the urethanization reaction, may optionally be used.

The blocked starting polyisocyanates A) may also be produced by reacting 4,4'-diisocyanatodicyclohexyl methane with a mixture of the polyol and ε-caprolactam in a single step so that the urethane-forming reaction and the blocking reaction take place at essentially the same time.

In the described process, the reaction temperature for the urethane modification is 40° to 200° C., preferably 60° to 160° C. and more preferably 60° to 130° C. The reaction temperature for the blocking reaction with ε-caprolactam is 40° to 160° C., preferably 80° to 140° C. Both reactions may be accelerated with suitable known catalysts, such as tertiary amines or metal salts, although the reactions are preferably uncatalyzed. The reactions are preferably carried out in the absence of solvents although it may be advisable in some cases to use inert solvents. If desired, the blocked polyisocyanates A) may be prepared in solvents and subsequently freed from the solvent and isolated, for example by an evaporation process, such as described hereinafter with reference to the production of component B).

The described process results in solid, linear to slightly branched, blocked polyisocyanates A) having the above-mentioned functionality; a melting point of 30° to 120° C., preferably 50° to 110° C.; a blocked NCO content, expressed as NCO (MW=42), of 3.0 to 14.0% by weight, preferably 7.0 to 11.0% by weight; and a free NCO content of less than 0.5% by weight.

The polyol component B) is based on at least one acrylate polyol and has a hydroxyl value of 40 to 120. The polyacrylate component B) has a melting point or melting range of about 30° to 120° C., preferably 50° to 110° C.

These copolymers are copolymers of a) 20 to 50 parts by weight, preferably 30 to 45 parts by weight, of methyl methacrylate, b) 20 to 40 parts by weight, preferably 20 to 30 parts by weight, of alkyl esters of acrylic and/or methacrylic acid containing 2 to 8 carbon atoms in the alkyl radical, c) 0 to 30 parts by weight, preferably 5 to 25 parts by weight, of styrene, d) 10 to 30 parts by weight, preferably 12 to 28 parts by weight, of hydroxyethyl methacrylate and/or hydroxypropyl methacrylate and e) 0.1 to 3.0 parts by weight, preferably 0.5 to 1.5 parts by weight, of acrylic acid and/or methacrylic acid, provided that the sum of the total parts by weight of components a) to e) is 100.

The monomers b) are preferably alkyl esters of acrylic or methacrylic acid such as ethyl (meth)acrylate, n-propyl (meth)acrylate, isopropyl (meth)acrylate, n-butyl (meth) acrylate, isobutyl (meth)acrylate, and 2-ethylhexyl (meth) acrylate.

The polyacrylate polyols B) are preferably produced by radical-initiated copolymerization of the above-mentioned monomers in suitable organic solvents.

The monomers are copolymerized at temperatures of 60° to 180° C., preferably 80° to 160° C. in the presence of radical formers and, optionally, molecular weight regulators.

The copolymers are preferably produced in inert organic solvents. Suitable solvents include aromatic hydrocarbons such as toluene or xylene; esters such as ethyl acetate or butyl acetate; ketones such as acetone, methyl ethyl ketone or methyl isobutyl ketone; and mixtures of these solvents.

The production of the copolymers may be continuous or discontinuous. Normally, the monomer mixture and the initiator are uniformly and continuously introduced into a polymerization reactor and, at the same time, the corresponding quantity of polymer is continuously removed. Copolymers which are substantially chemically uniform may advantageously be produced in this way. Copolymers which are substantially chemically uniform may also be produced by introducing the reaction mixture at a constant rate into a stirred tank without removing the polymer.

A portion of the monomers may be introduced, for example in solvents, and the remaining monomers and auxiliaries may be subsequently added either separately or together at the reaction temperature. The polymerization generally takes place under atmospheric pressure, although it may also be carried out under pressures of up to 25 bar. The initiators are used in quantities of 0.05 to 15% by weight, based on the total quantity of monomers.

Suitable initiators are known and include radical initiators, for example, aliphatic azo compounds such as azodiisobutyronitrile, azo-bis-2-methyl valeronitrile, 1,1'-azo-bis-1-cyclohexane nitrile and 2,2'-azo-bis-isobutyric acid alkyl ester; symmetrical diacyl peroxides such as acetyl, propionyl or butyryl peroxide, bromine-, nitro-, methyl- or methoxy-substituted benzoyl peroxides and lauryl peroxides; symmetrical peroxydicarbonates such as diethyl, diisopropyl, dicyclohexyl and dibenzoyl peroxydicarbonate; tert. butyl peroxy-2-ethyl hexanoate; tert. butyl perbenzoate; hydroperoxides such as tert. butyl hydroperoxide and cumene hydroperoxide; and dialkyl peroxides such as dicumyl peroxide, tert. butyl cumyl peroxide and di-tert. butyl peroxide.

Typical regulators may be used in the production of the copolymers to regulate their molecular weight. Examples of suitable molecular weight regulators are tert. dodecyl mercaptan, n-dodecyl mercaptan and diisopropyl xanthogene disulfide. The regulators may be added in quantities of 0.1 to 10% by weight, based on the total quantity of monomers.

This procedure results in organic solutions of the hydroxy-functional polyacrylates B) which are isolated by evaporation of the solvent as ready-to-use solids having the above-mentioned melting behavior and the above-mentioned hydroxyl value.

The solvent or solvent mixture is removed substantially completely, generally to a residual content of ≦2% by weight, preferably ≦1% by weight, for example by spray drying, degassing in evaporation extruders or vacuum distillation.

Catalyst component C) is selected from tin compounds which are known as catalysts for the addition reaction between hydroxyl groups and isocyanate groups. With these known catalysts, the stoving temperature of the powder coating compositions can be reduced to 140° to 170° C. when the above-described diisocyanatodicyclohexyl methane-based polyisocyanates A) are used; whereas, corresponding polyisocyanates based on isophorone diisocyanate do not give sufficiently crosslinked lacquer films at these low temperatures as shown in the following comparison examples.

Preferred tin compounds C) include tin(II) salts of $C_{6-12}$ alkane carboxylic acids such as tin (II) hexanoate, tin(II) octanoate and tin(II) laurate; tin(II) octanoate (essentially tin(II)-2-ethyl hexanoate) is particularly preferred.

Tin (IV) compounds, such as dibutyl tin oxide, dibutyl tin dichloride, dibutyl tin diacetate, dibutyl tin dilaurate, dibutyl tin maleate and dioctyl tin diacetate, may also be used, but are not preferred. Catalyst mixtures may also be used.

Further representatives of suitable catalysts and information on their method of operation can be found in Kunststoffhandbuch, Vol. VII, edited by Vieweg & Hochtlen, Carl-Hanser-Verlag, Munchen 1966, for example, on pages 96 to 102.

The auxiliaries and additives D), which may optionally be used, include flow control agents such as polybutyl acrylate or those based on polysilicones; light stabilizers such as sterically hindered amines; UV absorbers such as benzotriazoles or benzophenones; and pigments such as titanium dioxide.

Other additives D) include color stabilizers against the danger of yellowing by overstoving. Suitable color stabilizers include trialkyl and/or triaryl phosphites optionally having inert substituents, such as triethyl phosphite, triphenyl phosphite and, preferably, tris-alkylphenyl phosphites wherein the alkyl substituents contain 6 to 12 carbon atoms.

Tris-nonylphenyl phosphite (commercial product primarily containing an ester of phosphorous acid with the adduct of tripropylene and phenol) is particularly preferred.

The ready-to-use powder coating composition may be produced, for example, by mixing the individual components together after they have been reduced to powder. In such a case, the individual powder particles would consist of the individual components A), B), C) or, optionally, D). In the preferred production of the powder coatings, however, components A), B), C) and, optionally, D) are thoroughly mixed together and the resulting mixture is compounded, for example in an extruder or kneader, at temperatures above the melting range of the individual components, for example at 70° to 140° C., to form a homogeneous material.

The solid material obtained after cooling of the melt is subsequently ground and freed by sieving from any particles above the desired particle size, for example above 0.1 mm. "Mixed powders" in which each individual powder particle contains the individual components A), B), C) and, optionally, D) are formed in this manner.

The individual components A) to D) may be combined in any order. For example, the catalyst C) and additive D) may be added to the polyisocyanate component A) during its production or, alternatively, these individual components may be added to component B), for example after polymerization but before evaporation.

The quantities in which individual components A) and B) are used are selected so that, for every hydroxyl group of component B), there are 0.5 to 1.2, preferably 0.6 to 1.0, blocked isocyanate groups of component A). The catalyst component C) is used in quantities of 0.1 to 5% by weight, preferably 0.2 to 3% by weight, based on the weight of components A) and B). The phosphite used as additive D) is added in quantities of up to 5% by weight, preferably in quantities of up to 3% by weight, based on the weight of components A) and B).

The powder coating compositions may be applied to the substrates to be coated by standard powder application techniques, such as electrostatic powder spraying or fluidized bed coating. The coatings are cured by heating to temperatures of 140° to 220° C., preferably 140° to 170° C., for example over a period of 10 to 60 minutes. The coatings obtained are hard, glossy, solvent-resistant and sufficiently elastic, and combine excellent corrosion-inhibiting properties with good color stability at high temperatures.

Any heat-resistant substrates, including for example glass or metal substrates, may be coated in accordance with the invention.

The parts and percentages in the following examples are by weight, unless otherwise stated.

EXAMPLES

Example 1

Preparation of a polyisocyanate component A) according to the invention 524 parts of 4,4'-diisocyanatodicyclohexyl methane were introduced into a reaction vessel at approximately 100° C. and 226 parts of ε-caprolactam were added in portions at that temperature without further heating. The exothermic reaction took place at a temperature of 100 to 130° C. The calculated NCO content of approx. 11.2% was reached after stirring for about 20 minutes at that temperature. Without cooling, 118 parts of hexane-1,6-diol were added at about 120° C. and the increasingly viscous melt was stirred at that temperature for about 3 hours until a free NCO content of 0.5% was titrated and showed no further reduction. The melt was poured out onto a metal plate and left to cool. A storable, light solid resin was obtained which had a melting point of approx. 75° C., a blocked NCO content of 9.7% (expressed as NCO) and a free NCO content of 0.2%.

Example 2

Preparation of a polyisocyanate component A) according to the invention

Example 1 was repeated with the exception that 35 parts of tris-nonylphenyl phosphate were stirred in as additive D) on completion of the reaction over a period of 30 minutes at 130° C. until it was homogeneously distributed. A storable light solid resin was obtained which had a melting point of approx. 75° C., a blocked NCO content of 9.3% and a free NCO content of 0.3%.

Example 3

Preparation of a polyisocyanate component A) according to the invention

Using the procedure set forth in Examples 1 and 2, 524 parts of 4,4'-diisocyanatodicyclohexyl methane were reacted with 226 parts of ε-caprolactam, 59 parts of hexane-1,6-diol and 52 parts of 2,2-dimethylpropane-1,3-diol, and 34 parts of tris-nonylphenyl phosphite were stirred in at 130° C. A storable light solid resin was obtained which had a melting point of approx. 80° C., a blocked NCO content of 9.4% and a free NCO content of 0.4%.

Comparison Example A

Preparation of an IPDI-based polyisocyanate component for comparison

Using the procedure set forth in Examples 1 and 2, 444 parts of isophorone diisocyanate were reacted with 226 parts of ε-caprolactam and 118 parts of hexane-1,6-diol, and 33 parts of tris-nonylphenyl phosphate were stirred in at 130° C. A storable light solid resin was obtained which had a melting point of approx. 80° C., a blocked NCO content of 10.2% and a free NCO content of 0.2%.

Examples 4 to 7

Preparation of hydroxypolyacrylates B) according to the invention

General procedure

Part I was introduced into a 25 liter stainless steel pressure reactor equipped with a stirrer and cooling and heating system, and heated to the reaction temperature. Part II (added over a total period of 4 hours) and part III (added over a total period of 5 hours) were then introduced beginning at the same time. The mixture was then stirred for 2 hours at the temperature indicated. The polymer solutions obtained were completely freed from solvent in a commercially available evaporation extruder over a period of about 2 minutes at a temperature of approx. 150° C. and under a vacuum of approx. 200 mbar, after which the product was cooled and granulated.

The reaction temperatures and the composition of parts of I to III are set forth in Table 1 together with the characteristic data of the copolymers obtained.

TABLE 1

| Hydroxyfunctional copolymers B1 to B4 (quantities in g) | | | | |
|---|---|---|---|---|
| Example | 4 | 5 | 6 | 7 |
| Copolymers | $B_1$ | $B_2$ | $B_3$ | $B_4$ |
| Part I | | | | |
| Toluene | 9000 | 9000 | | 9000 |
| Methyl isobutyl ketone | | | 9000 | |
| Part II | | | | |
| Methyl methacrylate | 3660 | 4328 | 3916 | 4308 |
| n-butyl methacrylate | 2314 | 2690 | | |
| 2-ethyl hexyl acrylate | | | | 1958 |
| n-butyl acrylate | | | 1958 | |
| Styrene | 1868 | 1258 | 1958 | 980 |
| 2-hydroxyethyl methacrylate | 1892 | 1418 | | |
| Hydroxypropyl methacrylate) | | | 1836 | 2360 |
| Acrylic acid | 100 | 98 | | |
| Methacrylic acid | | | 122 | 186 |
| Part III | | | | |
| tert. butylperoxy-2-ethyl hexanoate (7-% in isododecane | 480 | 582 | 582 | 582 |
| Toluene | 668 | 626 | | 626 |
| Methyl isobutyl ketone | | | 628 | |
| Polymerization temperature (°C.) | 125 | 110 | 115 | 110 |
| Solids content (%) before evaporation (based on solution) | 50.7 | 50.1 | 50.2 | 51.2 |
| Viscosity at 23° C. (mPa · s) after evaporation (based on solid resin) | 1880 | 1320 | 270 | 2720 |
| OH value | 70 | 64 | 68 | 84 |
| Acid value | 7.4 | 4.8 | 3.9 | 6.0 |

*Technical mixture of 2- and 3-hydroxypropyl methacrylate

EXAMPLE 8 AND COMPARISON EXAMPLE B

Use

Example 8 demonstrates the low: stoving temperature (150° C. and higher) for a clear coating composition according to the invention, while Comparison Example B shows that crosslinking was far slower without catalyst component C), which is a critical component of the invention, as reflected in the gel times.

Clear coatings were prepared from the following components:

(Quantities in parts by weight)

|  | Example 8 | Comparison Example B |
|---|---|---|
| Polyisocyanate A) of Example 1 | 35.3 | 35.7 |
| Polyacrylate B₁) of Example 4 | 62.7 | 63.3 |
| Catalyst C) Tin(II) octanoate | 1.0 | — |
| Additive D) | 1.0 | 1.0 |
| Perenol F 30 P* | 100 | 100 |

*Perenol F 30 P is a commercially available flow control agent based on a butyl acrylate copolymer (manufacturer: Henkel KGaA, Düsseldorf)

To prepare the powder coating compositions, the components were extruded by means of a Werner & Pfleiderer ZDSK 28 twinscrew extruder under the following conditions: screw speed 200 r.p.m., housing temperature 100° C., exit temperature 120° C., and residence time approx. 70 seconds. The granules obtained were ground and sieved in an ACM 2 grading mill (manufacturer: Hosokawa Mikropul) with a 90 μm sieve.

The gel times (measured in accordance with DIN 55 990, Part 8, Point 5.1) of the coatings were as follows:

|  | Example 8 | Comparison Example B |
|---|---|---|
| 180° C. | 95 secs. | 310 secs. |
| 160° C. | 330 secs. | 900 secs. |

A degreased steel plate was coated with the powder coating composition of Example 8 according to the invention and stoved for 20 minutes and 30 minutes in a gradient furnace at 150° C./160° C./170° C./180° C., so that a layer thickness of 60±5 μm was obtained.

Test results*)

|  | 150° C. | | 160° C. | | 170° C. | | 180° C. | |
|---|---|---|---|---|---|---|---|---|
|  | 20' | 30' | 20' | 30' | 20' | 30' | 20' | 30' |
| G 20 | 58 | 65 | 61 | 58 | 59 | 55 | 54 | 56 |
| G 60 | 97 | 102 | 98 | 95 | 92 | 90 | 89 | 88 |
| EI | 0.3 | 4.5 | 6.0 | 7.0 | 5.1 | 6.4 | 6.3 | 7.3 |
| AR | 1 | 0 | 0 | 0 | 0 | 0 | 0 | 0 |

*)G 20, G 60 = Gardner gloss in reflection angle 20° and 60°
EI = Erichsen indentation, DIN 53 156
AR = Acetone resistance (50 double rubs with impregnated cotton wool plug)
0 = film intact
1 = film surface partly softened
2 = film swollen through to substrate These tests demonstrate that a solvent-resistant lacquer (AR=0) was obtained after only 30 minutes at 150° C. and that the full Erichsen indentation was achieved at a stoving temperature of only 160° C.

Comparison Examples C) and D)

Use

For comparison, clear powder coating compositions containing the polyisocyanate of Comparison Example A), based on the isophorone diisocyanate, were produced and tested in the same manner as set forth in Example 8 and Comparison Example B.

|  | Comparison Example C | Comparison Example D |
|---|---|---|
| Polyisocyanate of Comparison Example A | 36.2 | 36.6 |
| Polyacrylate B₁) of Example 4 | 61.8 | 62.4 |
| Catalyst C) tin(II) octanoate | 1.0 | — |
| Additive D)~ | 1.0 | 1.0 |
| Perenol F 30 P | 100.0 | 100.0 |

The powder coating compositions were produced in accordance with Example 8 and Comparison Example B.

The coatings had the following gel times:

|  | Comparison Example C | Comparison Example D |
|---|---|---|
| 180° C. | 125 secs. | 340 secs. |
| 160° C. | 500 secs. | 970 secs. |

A degreased steel plate was coated with the powder corresponding to Comparison Example C and stoved for 30 minutes in a gradient furnace at 150° C./160° C. /170° C./180° C.: layer thickness 60±5 μm.

| Test results | 150° C. | 160° C. | 170° C. | 180° C. |
|---|---|---|---|---|
| G 20 | 69 | 71 | 69 | 68 |
| G 60 | 111 | 111 | 111 | 108 |
| EI | 0.3 | 2.0 | 5.8 | 1.4 |
| AR | 2 | 1 | 0 | 0 |

These tests demonstrate that, in contrast to Example 8 according to the invention, solvent-resistant coatings were only obtained after stoving for 30 minutes at a stoving temperature of at least 170° C. and that the full Erichsen indentation was only achieved after 30 minutes at 180° C.

Examples 9 and 10

Use

These examples according to the invention show that coatings having distinctly higher whiteness values (Example 10) were obtained when a phosphate stabilizer D), which reduces yellowing caused by overstoving, was used.

Pigmented powder coating compositions were prepared from the following components (quantities in parts by weight):

|  | Example 9 | Example 10 |
|---|---|---|
| Polyisocyanate A) Example 1 | 27.2 | — |
| Polyisocyanate A) of Example 2 | — | 27.2 |
| Polyacrylate B₁) of Example 4 | 42.1 | 42.1 |
| Catalyst C) Tin(II) octanoate | 0.4 | 0.4 |
| Additive D) | 0.3 | 0.3 |
| Modaflow P III* |  |  |

-continued

|  | Example 9 | Example 10 |
|---|---|---|
| TiO2 pigment (Bayertitan R-KB 4) | 30.0 | 30.0 |
|  | 100.0 | 100.0 |

*) Modaflow P III is a commercially available flow control agent based on a butyl acrylate copolymer (manufacturer: Monsanto)

To prepare the pigmented white coatings, the components were extruded in a Buss PLK 46 co-kneader under the following conditions: 150 r.p.m., housing temperature 70° C./100° C., screw temperature 70° C. and exit temperature approx. 120° C. The granules obtained were ground and sieved in an ACM 2 grading mill (manufacturer: Hosokawa Mikropul) with a 90 μm sieve. 80±5 μm coatings on degreased steel plates were cured for 10 minutes at 200° C., one plate being additionally overstoved for 15 minutes at 200° C. and another for 20 minutes at 220° C.

| Test results: | Example 9 | Example 10 |
|---|---|---|
| G 60 | 82 | 82 |
| EI | 7.4 | 7.8 |
| AR | 0–1 | 0–1 |
| Whiteness* | 78.4 | 83.1 |
| After overstoving +15'/200° C. | 69.6 | 79.2 |
| After overstoving +20'/220° C. | 48.7 | 67.8 |

These examples demonstrate that, in the case of the stabilized powder coating composition (Example 10), coatings having good whiteness values were obtained despite the very high stoving temperature and the overstoving; whereas, the unstabilized powder coating composition (Example 9) resulted in a coating having much poorer whiteness after overstoving.

*) As measured with a Berger Elrephomat

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A powder coating composition for the production of glossy flexible coatings which is solid below 30° C. and liquid above 120° C. and comprises
   A) a polyisocyanate component which
      i) has a content of blocked isocyanate groups (expressed as NCO, molecular weight=42) of 3.0 to 14.0% by weight,
      ii) has a functionality, based on the blocked isocyanate groups, of 1.9 to 2.3 and
      iii) contains at least one ε-caprolactam-blocked polyisocyanate based on the reaction' product of 4,4'-diisocyanatodicyclohexyl methane with a polyol component having an average molecular weight of 90 to 400 and containing at least 50% by weight, based on the weight of the polyol component, of one or more (cyclo)aliphatic diols containing 4 to 12 carbon atoms,
   B) a polyacrylate polyol component containing at least one polyhydroxy polyacrylate having an OH number of 40 to 120 and
   C) an organotin catalyst for the reaction between hydroxyl groups and blocked isocyante groups, wherein components A) and B) are present in qualities which correspond to an equivalent ratio of blocked isocyante groups of the polyisocyanate component to hydroxyl groups of the polyacrylate polyol component of 0.5:1 to 1.2:1.

2. The powder coating composition of claim 1 wherein component B) comprises a copolymer prepared from
   a) 20 to 50 parts by weight of methyl methacrylate,
   b) 20 to 40 parts by weight of at least one alkyl ester of acrylic and/or methacrylic acid containing 2 to 8 carbon atoms in the alkyl radical,
   c) 0 to 30 parts by weight of styrene,
   d) 10 to 30 parts by weight of hydroxyethyl methacrylate and/or hydroxypropyl methacrylate and
   e) 0.1 to 3.0 parts by weight of acrylic acid and/or methacrylic acid, wherein the sum of the total parts by weight of components a) to e) is 100.

3. The powder coating composition of claim 1 wherein component B) comprises a copolymer prepared from
   a) 30 to 45 parts by weight of methyl methacrylate,
   b) 20 to 30 parts by weight of at least one alkyl ester of acrylic and/or methacrylic acid containing 2 to 8 carbon atoms in the alkyl radical,
   c) 5 to 25 parts by weight of styrene,
   d) 12 to 28 parts by weight of hydroxyethyl methacrylate and/or hydroxypropyl methacrylate and
   e) 0.5 to 1.5 parts by weight of acrylic acid and/or methacrylic acid, wherein the sum of the total parts by weight of components a) to e) is 100.

4. The powder coating composition of claim 1 wherein the polyisocyanate component of component A)
   i) has a content of blocked isocyanate groups (expressed as NCO, molecular weight=42) of 7.0 to 11.0% by weight,
   ii) has a functionality, based on the blocked isocyanate groups, of 2.0 to 2.2 and
   iii) contains at least one ε-caprolactam-blocked polyisocyanate based on the reaction product of 4,4'-diisocyanatodicyclohexyl methane with a polyol component having an average molecular weight of 90 to 400 and containing at least 80% by weight, based on the weight of the polyol component, of one or more (cyclo)aliphatic diols containing 6 to 12 carbon atoms.

5. The powder coating composition of claim 2 wherein the polyisocyanate component of component A)
   i) has a content of blocked isocyanate groups (expressed as NCO, molecular weight=42) of 7.0 to 11.0% by weight,
   ii) has a functionality, based on the blocked isocyanate groups, of 2.0 to 2.2 and
   iii) contains at least one ε-caprolactam-blocked polyisocyanate based on the reaction product of 4,4'-diisocyanatodicyclohexyl methane with a polyol component having an average molecular weight of 90 to 400 and containing at least 80% by weight, based on the weight of the polyol component, of one or more (cyclo)aliphatic diols containing 6 to 12 carbon atoms.

6. The powder coating composition of claim 3 wherein the polyisocyanate component of component A)
   i) has a content of blocked isocyanate groups (expressed as NCO, molecular weight=42) of 7.0 to 11.0% by weight,
   ii) has a functionality, based on the blocked isocyanate groups, of 2.0 to 2.2 and iii) contains at least one ε-caprolactam-blocked polyisocyanate based on the reaction product of 4,4'-diisocyanatodicyclohexyl methane with a polyol component having an average molecular weight of 90 to 400 and containing at least 80% by weight, based on the weight of the polyol component, of one or more (cyclo)aliphatic diols containing 6 to 12 carbon atoms.

7. The powder coating composition of claim 1 wherein said catalyst comprises tin(II) octanoate.

8. A powder coating composition for the production of glossy flexible coatings which is solid below 30° C. and liquid above 120° C. and comprises A) a polyisocyanate component which
   i) has a content of blocked isocyanate groups (expressed as NCO, molecular weight=42) of 3.0 to 14.0% by weight,
   ii) has a functionality, based on the blocked isocyanate groups, of 1.9 to 2.3 and
   iii) contains at least one ε-caprolactam-blocked polyisocyanate based on the reaction product of 4,4'-diisocyanatodicyclohexyl methane with a polyol component having an average molecular weight of 90 to 400 and containing at least 50% by weight, based on the weight of the polyol component, of one or more (cyclo)aliphatic diols containing 4 to 12 carbon atoms, B) a polyacrylate polyol component containing at least one polyhydroxy polyacrylate having an OH number of 40 to 120, C) an organotin catalyst for the reaction between hydroxyl groups and blocked isocyanate groups and D) a positive amount of up to about 5% by weight, based on the weight of
   components A) and B), of at least one trialkyl and/or triaryl phosphite, wherein components A) and B) are present in quantities which correspond to an equivalent ratio of blocked isocyanate groups of the polyisocyanate component to hydroxyl groups of the polyacrylate polyol component of 0.5:1 to 1.2:1.

9. The powder coating composition of claim 8 wherein component B) comprises a copolymer prepared from
   a) 20 to 50 parts by weight of methyl methacrylate,
   b) 20 to 40 parts by weight of at least one alkyl ester of acrylic and/or methacrylic acid containing 2 to 8 carbon atoms in the alkyl radical,
   c) 0 to 30 parts by weight of styrene,
   d) 10 to 30 parts by weight of hydroxyethyl methacrylate and/or hydroxypropyl methacrylate and
   e) 0.1 to 3.0 parts by weight of acrylic acid and/or methacrylic acid,
wherein the sum of the total parts by weight of components a) to e) is 100.

10. The powder coating composition of claim 8 wherein component B) comprises a copolymer prepared from
    a) 30 to 45 parts by weight of methyl methacrylate,
    b) 20 to 30 parts by weight of at least one alkyl ester of acrylic and/or methacrylic acid containing 2 to 8 carbon atoms in the alkyl radical,
    c) 5 to 25 parts by weight of styrene,
    d) 12 to 28 parts by weight of hydroxyethyl methacrylate and/or hydroxypropyl methacrylate and
    e) 0.5 to 1.5 parts by weight of acrylic acid and/or methacrylic acid,
wherein the sum of the total parts by weight of components a) to e) is 100.

11. The powder coating composition of claim 8 wherein the polyisocyanate component of component A)
    i) has a content of blocked isocyanate groups (expressed as NCO, molecular weight=42) of 7.0 to 11.0% by weight,
    ii) has a functionality, based on the blocked isocyanate groups, of 2.0 to 2.2 and
    iii) contains at least one ε-caprolactam-blocked polyisocyanate based on the reaction product of 4,4'-diisocyanatodicyclohexyl methane with a polyol component having an average molecular weight of 90 to 400 and containing at least 80% by weight, based on the weight of the polyol component, of one or more (cyclo)aliphatic diols containing 6 to 12 carbon atoms.

12. The powder coating composition of claim 9 wherein the polyisocyanate component of component A)
    i) has a content of blocked isocyanate groups (expressed as NCO, molecular weight=42) of 7.0 to 11.0% by weight,
    ii) has a functionality, based on the blocked isocyanate groups, of 2.0 to 2.2 and
    iii) contains at least one ε-caprolactam-blocked polyisocyanate based on the reaction product of 4,4'-diisocyanatodicyclohexyl methane with a polyol component having an average molecular weight of 90 to 400 and containing at least 80% by weight, based on the weight of the polyol component, of one or more (cyclo)aliphatic diols containing 6 to 12 carbon atoms.

13. The powder coating composition of claim 10 wherein the polyisocyanate component of component A)
    i) has a content of blocked isocyanate groups (expressed as NCO, molecular weight=42) of 7.0 to 11.0% by weight,
    ii) has a functionality, based on the blocked isocyanate groups, of 2.0 to 2.2 and
    iii) contains at least one ε-caprolactam-blocked polyisocyanate based on the reaction product of 4,4'-diisocyanatodicyclohexyl methane with a polyol component having an average molecular weight of 90 to 400 and containing at least 80% by weight, based on the weight of the polyol component, of one or more (cyclo)aliphatic diols containing 6 to 12 carbon atoms.

14. The powder coating composition of claim 8 wherein said catalyst comprises tin(II) octanoate.

15. The powder coating composition of claim 8 wherein component D) is a tris-(alkylphenyl)-phosphite bearing $C_6$–$C_{12}$ alkyl substituents.

16. A coated heat-resistant substrate which is coated with a powder coating composition for the production of glossy flexible coatings which is solid below 30° C. and liquid above 120° C. and comprises A) a polyisocyanate component which
   i) has a content of blocked isocyanate groups (expressed as NCO, molecular weight=42) of 3.0 to 14.0% by weight,
   ii) has a functionality, based on the blocked isocyanate groups, of 1.9 to 2.3 and
   iii) contains at least one ε-caprolactam-blocked polyisocyanate based on the reaction product of 4,4'-diisocyanatodicyclohexyl methane with a polyol component having an average molecular weight of 90 to 400 and containing at least 50% by weight, based on the weight of the polyol component, of one or more (cyclo)aliphatic diols containing 4 to 12 carbon atoms, B) a polyacrylate polyol component containing at least one polyhydroxy polyacrylate having an OH number of 40 to 120 and C) an organotin catalyst for the reaction between hydroxyl groups and blocked isocyanate groups, wherein components A) and B) are present in quantities which correspond to an equivalent ratio of blocked isocyanate groups of the polyisocyanate component to hydroxyl groups of the polyacrylate polyol component of 0.5:1 to 1.2:1.

17. The coated substrate of claim 16 wherein said substrate is a metallic automobile substrate and said coating is clear.

* * * * *